United States Patent
Haukioja et al.

(10) Patent No.: US 6,382,828 B1
(45) Date of Patent: May 7, 2002

(54) APPARATUS FOR TURNING AND/OR MIXING A FLAT BED COMPOST

(75) Inventors: Markku Haukioja, Eurajoki; Paavo Malkiainen, Eura; Osmo Haaslahti; Mikko Haaslahti, both of Kortela, all of (FI)

(73) Assignee: Biolan Oy (FI)

( * ) Notice: Subject to any disclaimer, the term of this patent is extended or adjusted under 35 U.S.C. 154(b) by 0 days.

(21) Appl. No.: 09/806,610

(22) PCT Filed: Oct. 5, 1999

(86) PCT No.: PCT/FI99/00819

§ 371 Date: Mar. 29, 2001

§ 102(e) Date: Mar. 29, 2001

(87) PCT Pub. No.: WO00/21906

PCT Pub. Date: Apr. 20, 2000

(30) Foreign Application Priority Data

Oct. 9, 1998 (FI) .................................................. 982195

(51) Int. Cl.[7] ................................................. B01F 7/24
(52) U.S. Cl. ........................ 366/300; 366/345; 366/261; 366/103
(58) Field of Search ................................. 366/297, 300, 366/261, 345, 346, 343, 102, 103, 104

(56) References Cited

U.S. PATENT DOCUMENTS

| | | | | |
|---|---|---|---|---|
| 636,959 A | * | 11/1899 | Dornfeld | 366/346 |
| 1,485,205 A | * | 2/1924 | Sturtevant | 366/345 |
| 2,895,720 A | * | 7/1959 | Koch et al. | 366/345 |
| 3,982,772 A | * | 9/1976 | Scherer | |
| 4,274,750 A | * | 6/1981 | Smit | 366/261 |

FOREIGN PATENT DOCUMENTS

| | | | | |
|---|---|---|---|---|
| CH | 685052 A5 | | 3/1995 | |
| DE | 445 624 | * | 6/1927 | 366/345 |
| DE | 569 915 | * | 1/1933 | 366/346 |
| DE | 1 074 371 | * | 1/1960 | 366/300 |
| FI | 88993 B | | 4/1993 | |
| FI | 94859 B | | 7/1995 | |
| FI | 100527 B | | 12/1997 | |
| FI | 100527 B | * | 12/1997 | 366/102 |
| FR | 786 077 | * | 8/1935 | 366/346 |
| JP | 6-233623 | * | 8/1994 | 366/261 |
| SE | 313 579 | | 8/1969 | |
| WO | WO-93/ 16017 | * | 8/1993 | 366/346 |

* cited by examiner

*Primary Examiner*—Tony G. Soohoo
(74) *Attorney, Agent, or Firm*—Gifford, Krass, Groh, Sprinkle, Anderson & Citkowski, P.C.

(57) ABSTRACT

An apparatus for turning and mixing a flat bed composting mass includes an even number of mixing worms that each rotate about a vertical shaft. The end of each vertical shaft may include a wear-resistant element on its end which serves to protect the shaft during operation. The vertical shafts may also be hollow and include an air hole for transmitting air into the composting mass. The pair of mixing worms preferably rotate in opposite directions to lift the composting mass upwardly from the bottom of the mass.

16 Claims, 3 Drawing Sheets

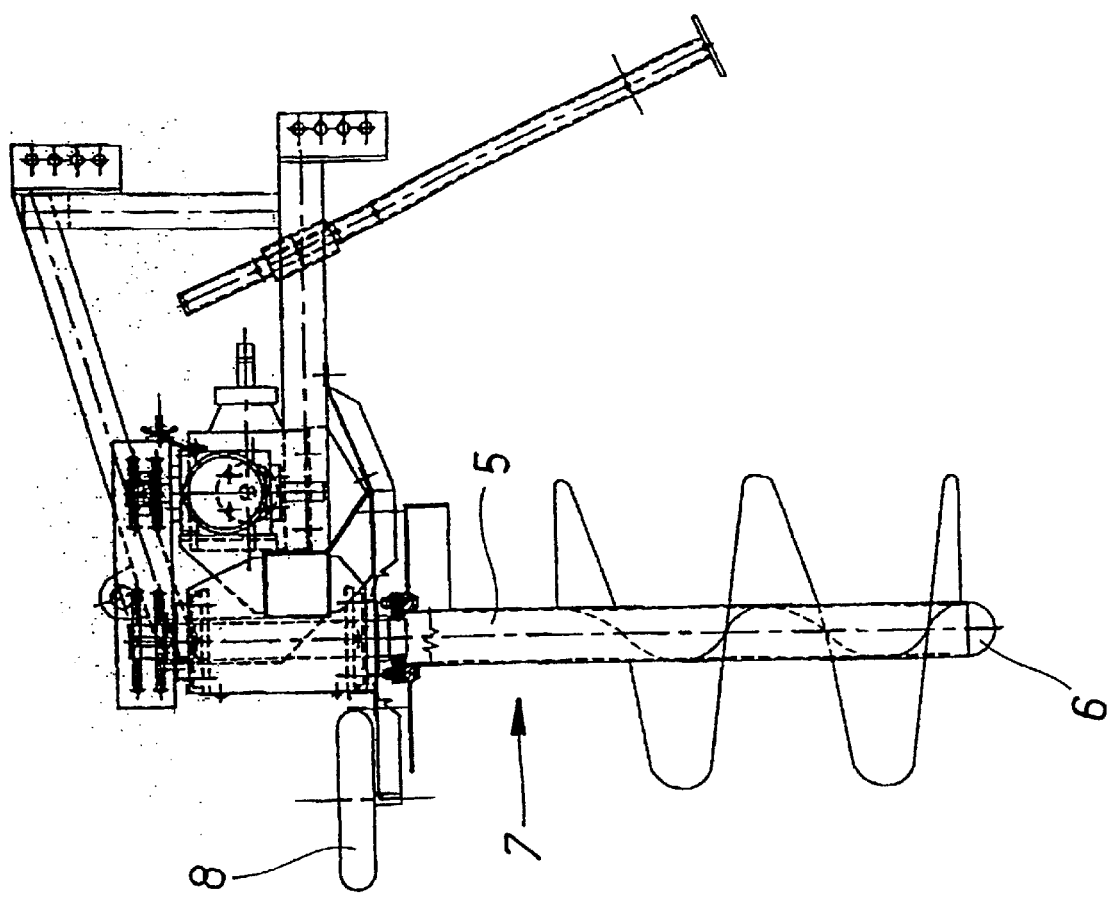

APPARATUS FOR TURNING AND/OR MIXING A FLAT BED COMPOST

BACKGROUND OF THE INVENTION

1. Field of the Invention

The present invention relates to an apparatus for turning and/or mixing a flat bed compost. The apparatus can be towable by a vehicle, e.g. a tractor, or self-propelled.

2. Reference to Related Art

The term flat bed compost refers to a continuous "mattress", which is most commonly 0.8–2.5 meters in height and made up by compostable organic waste. In flat bed composting, the compostable waste is not worked into separate stacks like in traditional composts. Flat bed composting is a common practice, especially in mechanically aerated composting systems.

Flat bed composting is a common composting process used in composting carried out in special buildings or in separate silos. Thus, the turning and mixing of a compost mass is generally effected by implements which are mounted e.g. on a separate guide bridge, rails constructed alongside the bridges, or other such support structures present outside the composting mass. Such turning implements are not suitable for working large continuous flat bed composts.

The working of flat bed composts is also performed by using motor-driven or tractor-drawn turning or mixing implements which travel along the field surface and remove compostable mass from one side of the path thereof over to the other. In this case, the removal of compost is effected either by means of a separate conveyor or by centrifuging.

BRIEF SUMMARY OF THE INVENTION

An object of the present invention is to provide an apparatus, which is suitable for the effective and frequently repeated turning and mixing of a shallow flat bed compost (0.8–1.5 m in thickness) in particular, and which apparatus is also effectively useful for turning and mixing large, e.g. multi-hectare outdoor flat bed composts.

In order to achieve this objective, an apparatus of the invention is characterized in that the mixer elements comprise an even number of mixing worms rotating around a vertical shaft, said mixing worms being adapted to rotate in directions opposite to each other in such a way that half of the mixing worms rotate clockwise and the other half rotate counter-clockwise, and said mixing worms being adapted to bring compost mass from the bottom upwards.

A few preferred embodiments of the invention are set forth in dependent claims 2–6.

The benefits offered by an apparatus of the invention with respect to prior art methods of working a flat bed compost include, e.g. the following:

Since the apparatus of the invention travels along the surface of a composting mass, said apparatus does not require any clear passage for its working. Thus, the field area can be exploited as thoroughly as possible. It is also true that, as the work is interrupted, the composting mass will not be left with an empty furrow which, e.g. in case of abundant rains, may become drenched and turn into unmanageable mud.

Since the apparatus of the invention moves a composting mass to be treated only a short way from its original place, the relationship between the input of said apparatus and the amount of mass manageable per time unit is more favourable than what is achievable with presently available equipment.

Particularly in cold conditions, the apparatus of the invention is beneficial in terms of its operation. The apparatus primarily aerates and mixes the mass to be treated and supplies air within the mass. When using equipment designed earlier for the same purpose, the compost mass to be treated is exposed to chilling ambient air for a considerably longer period of time, whereby the mass to be composted in cold conditions may cool too much.

The aeration of a compost mass performed by an apparatus of the invention can be enhanced by using mixing elements in the form of hollow shaft mixing worms, having the shafts thereof provided with holes for supplying air more effectively into the bottom portion of a composting mass. As the mixing worms work a composting mass upward, the bottom section of the mixing worms develop inherently a negative pressure which enables the air to migrate effectively into the mass. The migration of air can be further enhanced by fitting the apparatus with a fan for blowing air into the shafts of the mixing worms.

BRIEF DESCRIPTION OF THE SEVERAL VIEWS OF THE DRAWINGS

The invention will now be described in more detail with reference to the accompanying drawings, wherein FIG. 3 shows the embodiment of FIG. 1 in a lateral view.

DETAILED DESCRIPTION OF THE INVENTION

Figure 1:
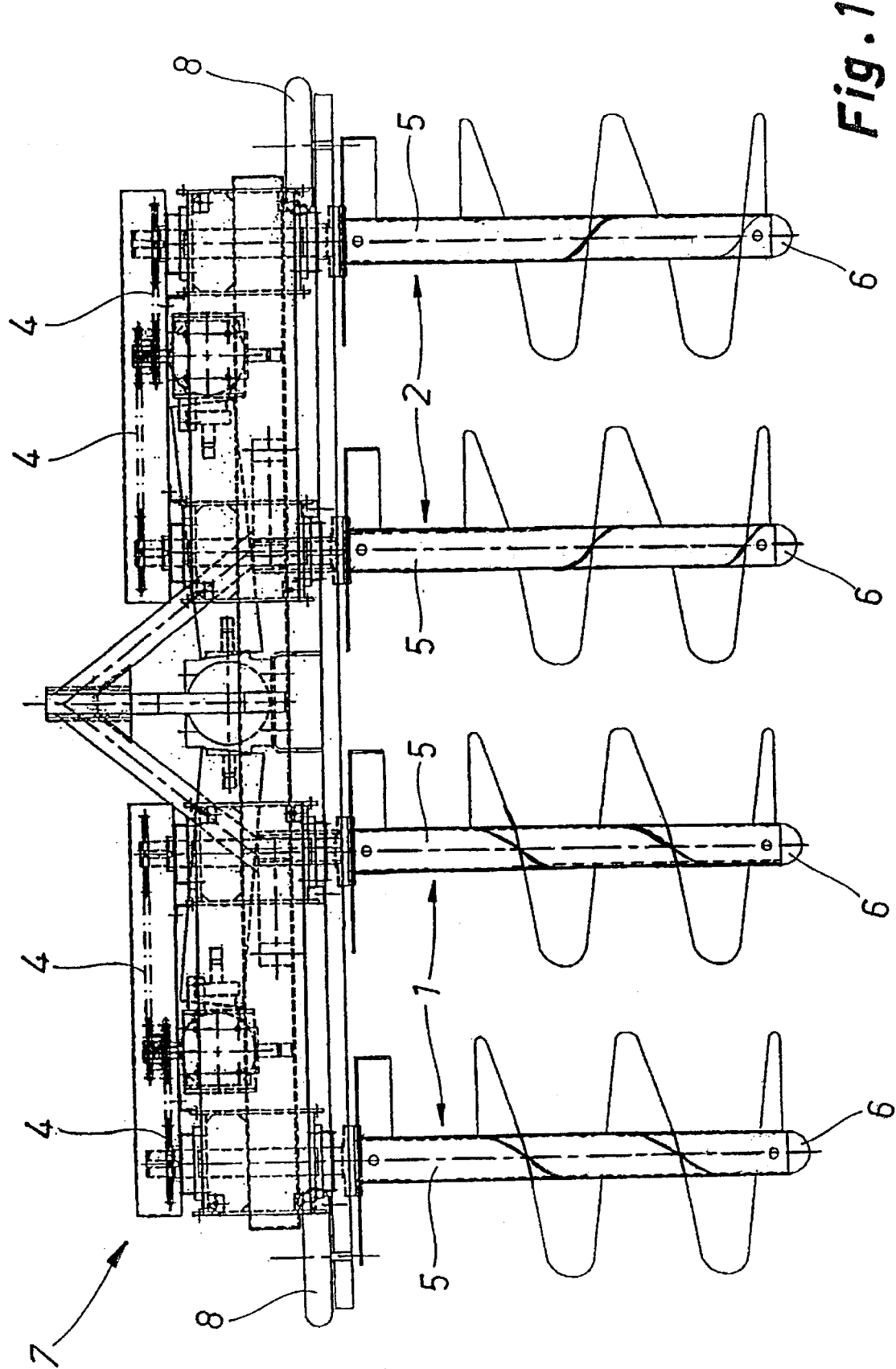
FIG. 1 shows one embodiment for an apparatus of the invention in a view from behind.
Figure 2:
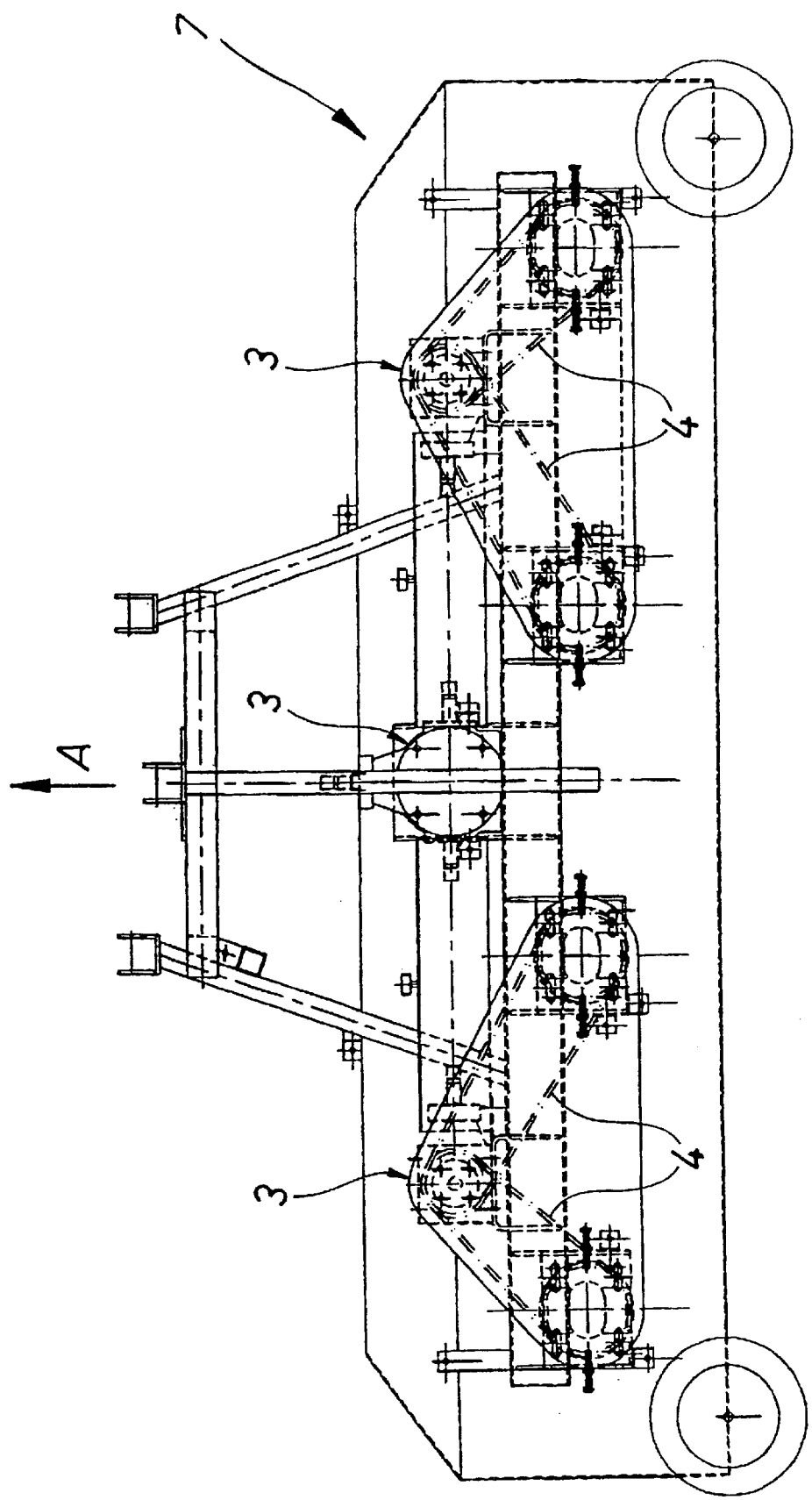
FIG. 2 shows the embodiment of FIG. 1 in a plan view.

In the embodiment of FIGS. 1–3, a turning and mixing apparatus intended for working a flat bed compost is depicted as a tractor-operated application. The illustrated embodiment shows an apparatus 7 provided with four mixing worms 1, 2. The mixing worms are located pairwise on either side of the median in the advancing direction (an arrow A in FIG. 2) of the apparatus, whereby the mixing worms 1 on the left-hand side in a rear-end view (FIG. 1) rotate clockwise and the right-hand mixing worms 2 rotate counter-clockwise. The mixing worms are also conceivable to be designed e.g. in such a way that the left-hand mixing worms rotate in opposite directions relative to each other and, respectively, the right-hand mixing worms in opposite directions relative to each other. The clockwise running mixing worms are provided with a right-hand thread and those running counter-clockwise with a left-hand one, whereby both pairs of mixing worms bring compost mass from the bottom upwards. In the illustrated embodiment, the apparatus receives its drive from the output shaft of a tractor by way of a wide-angle cardan shaft. The tractor which operates the apparatus is provided with a hydraulic push rod and wide wheels. Transmission in the apparatus 7 is effected by way of angle transmission 3 and chains 4. The mixing worms 1, 2 include shafts 5 which are hollow and provided with holes for aspirating air thereby through the shaft 5 into the bottom portion of a composting mass. The air has an access into the shaft by way of holes arranged on the top end of the shaft.

The shafts have the bottom end thereof provided with a wear-resistant element 6 whereby, when using the apparatus e.g. on a concrete- or asphalt bed, the apparatus 7 can be maneuvered upon the durable elements 6 along the bed. On a soft ground, e.g. a sand bed, the apparatus is most preferably supported exclusively by the three-point linkage of a tractor. Designated in the figures with reference numeral 8 are wheels, functioning in an indoor space as crash protectors.

The test apparatus according to the described embodiment has a working width of 3500 mm and a working depth of 1300 mm and a weight of 1150 kg. Such an apparatus is capable of mixing and turning about 1000 to 2000 cubic meters of compost per hour. These dimensions and performance figures for the apparatus are only given to represent one exemplary apparatus and by no means intended to limit the scope of protection for the invention as defined in the claims.

In the present embodiment, the apparatus is described as a towable implement attached to a tractor, provided with mixer elements which receive the drive therefor from the output shaft of a tractor, but it is also conceivable to construct the same provided with a separate drive motor for the mixer elements. The apparatus can also be designed as a self-propelled implement fitted with its own engine.

What is claimed is:

1. An apparatus for turning and mixing a flat-bed composting mass, the apparatus including a frame for attachment to a tractor being adapted to travel on top of the composting mass and comprising:
   an even number of mixing worms, each of said worms rotating about a vertical shaft, said worms being adapted to rotate in opposite directions such that half of said worms rotate in a clockwise direction and half of said worms rotate in a counterclockwise direction to lift the composting mass upwardly from a bottom of the mass; and
   a drive system secured to said apparatus adapted to rotate said worms.

2. The apparatus as set forth in claim 1, characterized in that the shaft of each of the mixing worms comprises a hollow shaft having at least one hole for supplying air into the bottom of the composting mass.

3. The apparatus as set forth in claim 2, characterized in that the apparatus further comprises at least one fan for supplying air into at least one shaft and through said at least one air hole into the composting mass.

4. The apparatus as set forth in claim 1, characterized in that the drive system is self propelled.

5. The apparatus of claim 1, wherein said drive system comprises a tractor adapted to tow the apparatus.

6. The apparatus of claim 1, wherein said worms rotating in a clockwise direction comprise a right-handed thread.

7. The apparatus of claim 1, wherein said worms rotating in a counterclockwise direction comprise a left-handed thread.

8. The apparatus of claim 1, wherein said apparatus further comprises at least one wheel to function as a crash protector.

9. The apparatus of claim 1, further comprising a replaceable durable element disposed on an end of each vertical shaft.

10. The apparatus of claim 9, wherein said drive system comprises an angle transmission and at least one chain.

11. The apparatus of claim 9, wherein said apparatus further comprises at least one wheel to function as a crash protector.

12. The apparatus of claim 9, wherein said first mixing worm comprises a right-handed thread.

13. The apparatus of claim 9, wherein said second mixing worm comprises a left-handed thread.

14. The apparatus of claim 9, further comprising a replaceable durable element disposed on an end of each vertical shaft.

15. An apparatus for turning and mixing a flat-bed composting mass, the apparatus being adapted to travel on top of the composting mass and comprising in combination:
   at least a first mixing worm and a second mixing worm, each of said worms rotating about a hollow vertical shaft having at least one hole for supplying air into a bottom of the composting mass, said worms being adapted to rotate in opposite directions such that said first mixing worm rotates in a clockwise direction and said second mixing worm rotates in a counterclockwise direction to lift the composting mass upwardly from a bottom of the mass; and
   a tractor secured to said apparatus and having a drive system adapted to rotate said worms.

16. An apparatus for turning and mixing a flat-bed composting mass, the apparatus being adapted to travel on top of the composting mass and comprising:
   an even number of mixing worms, each of said worms rotating about a vertical shaft having at a bottom end thereof a replaceable durable element, said worms being adapted to rotate in opposite directions such that half of said worms rotate in a clockwise direction and half of said worms rotate in a counterclockwise direction to lift the composting mass upwardly from a bottom of the mass; and
   a drive system secured to said apparatus adapted to rotate said worms.

* * * * *